United States Patent
Martini

(10) Patent No.: US 8,990,425 B1
(45) Date of Patent: Mar. 24, 2015

(54) DETERMINING DEVICE LOCATION BASED ON DOMAIN NAME RESPONSE

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/184,592

(22) Filed: Feb. 19, 2014

(51) Int. Cl.
    G06F 15/16    (2006.01)
    H04L 12/24    (2006.01)
    G06F 12/00    (2006.01)

(52) U.S. Cl.
    CPC ................................ *H04L 41/0803* (2013.01)
    USPC ...................................................... 709/245

(58) Field of Classification Search
    USPC ......... 790/203, 217–218, 223–229, 245–246, 790/250
    See application file for complete search history.

(56) References Cited

U.S. PATENT DOCUMENTS

| 7,127,492 | B1 * | 10/2006 | Calo et al. ................... 709/214 |
| 7,991,910 | B2 * | 8/2011 | Richardson et al. .......... 709/238 |
| 8,028,090 | B2 * | 9/2011 | Richardson et al. .......... 709/238 |
| 2006/0256789 | A1 * | 11/2006 | Otto et al. ..................... 370/389 |
| 2010/0278107 | A1 * | 11/2010 | Vikberg et al. ............... 370/328 |
| 2011/0295940 | A1 * | 12/2011 | Saleem et al. ................ 709/203 |

OTHER PUBLICATIONS

Thomson, et al. "Location Information Server (LIS) Discovery using IP address and Reverse DNS", Sep. 6, 2013, downloaded from the internet at http://www.xml2rfc.tools.ietf.org/id/draft-ietf-geopriv-res-gw-lis-discovery-06.html on Oct. 28, 2013, 12 pages.
Stussy, et al. "How do I find the geographical location of a host, given its IP address?" Downloaded from the internet at www.private.org/il/IP2geo.html on Oct. 28, 2013, 4 pages.

* cited by examiner

*Primary Examiner* — Zarni Maung
(74) *Attorney, Agent, or Firm* — Fish & Richardson P.C.

(57) ABSTRACT

Methods and systems for managing encrypted network traffic using spoofed addresses. One example method includes sending a domain name resolution query including a domain name; receiving a domain name resolution response including a network address; determining a current network location of the computing device based on the received domain name resolution response; and applying to the computing device either an internal network configuration or an external network configuration depending on the determined current network location of the computing device.

20 Claims, 5 Drawing Sheets

DETERMINING DEVICE LOCATION BASED ON DOMAIN NAME RESPONSE

BACKGROUND

This specification generally relates to determining a device's location based on responses to domain name queries.

In corporate and other networks, devices connected to the network may request resources on the network itself, or on external networks such as the Internet. These resources may include websites, file transfer services, servers, or other network resources. In some cases, this request may be made according to a secure protocol such as Hypertext Transfer Protocol Secure (HTTPS), Secure Socket Layer (SSL), Transport Level Security (TLS), or other protocols. The requested resources may be associated with domain names. A device may query a domain name server using the Domain Name System (DNS) protocol to determine an address corresponding to a given domain name.

SUMMARY

In general, one aspect of the subject matter described in this specification may be embodied in systems, and methods performed by data processing apparatuses that include the actions of sending a domain name resolution query including a domain name; receiving a domain name resolution response including a network address; determining a current network location of the computing device based on the received domain name resolution response; and applying to the computing device either an internal network configuration or an external network configuration depending on the determined current network location of the computing device.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
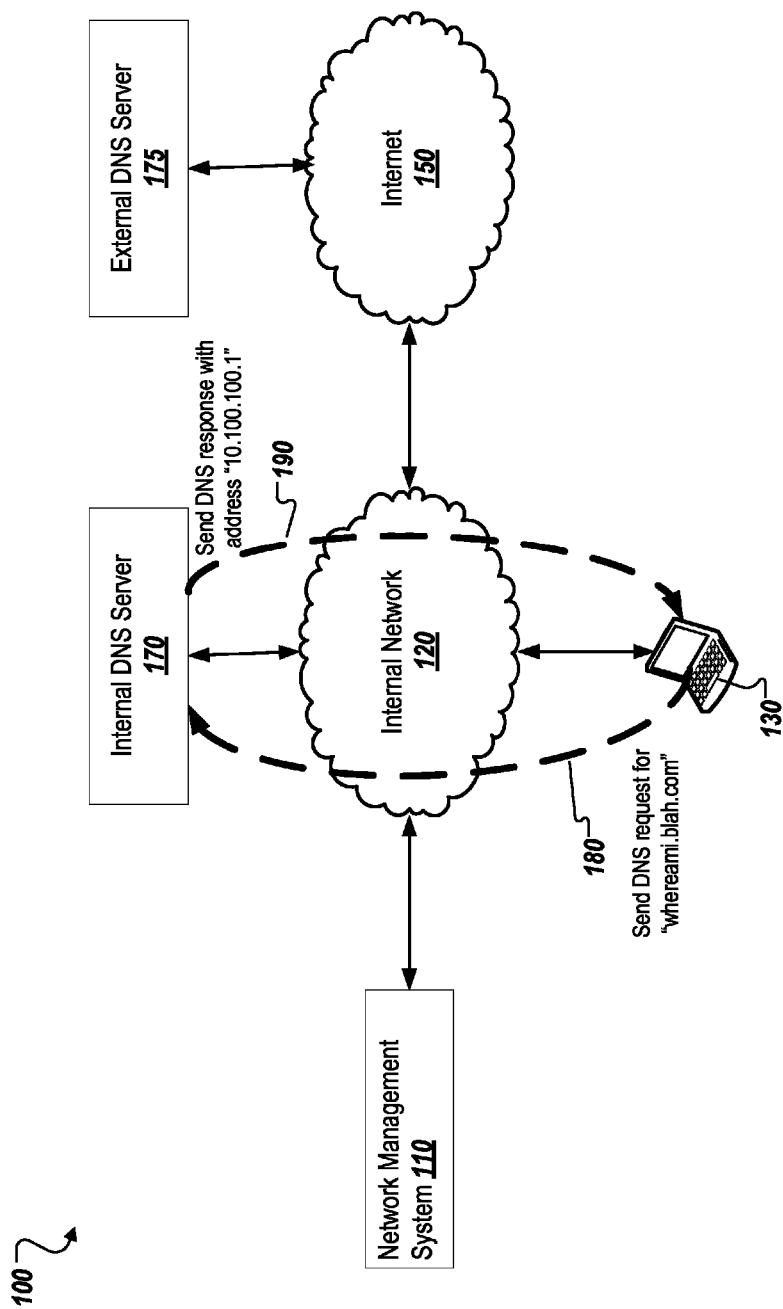
FIG. 1 is a diagram of an example environment depicting an example interaction between a device and an internal DNS server.

Network owners often want to apply different network configurations to a device when the device is connected to their network. For example, the network owner may wish to have a device use a certain proxy server when connected to their network. Because this proxy server may not be accessible when the device is connected to other networks, it may be necessary to detect when the device is connected to the network owner's network, and only use the proxy server in such a case. Stated another way, the network owner may desire to apply a network configuration to the device when it is connected to their network, and apply different configuration to the device when it is not connected to their network. In order to implement such functionality, the device may need to programmatically detect when it is connected to the network owner's network and when is connected to an external network. One previous solution involves pinging a known address to detect whether the device is connected to the network owner's network. If the ping receives a response, the device connected to the network owner's network. If the ping times out, the device connected to an external network. Such an approach is inefficient because the device must wait for the ping timeout. This can lead to noticeable delays when accessing the network from the device.

Another solution involves checking whether a domain name is resolvable via DNS. If the device receives a response to a DNS query for a specific location-determination domain name, the device may determine that it is on the network owner's network. If the DNS request for the location determination domain name times out, the device may determine that it is on an external network. This approach also involves waiting for request to timeout and therefore may lead to delays when accessing the network from the device.

The present disclosure describes a solution that involves using DNS queries to determine a device's current location. If the device is on an internal network owned by the network owner, the device will receive a response to the DNS query for a location-determination domain name including an internal network address. If the devices on an external network, such as the Internet, the device will receive a public address in response to the domain name query. Based on examining the addresses returned in response the domain name query, the device may determine whether it is on an internal or external network. In some implementations, the determination may be made by a proxy automatic configuration (PAC) script executing on the device.

The techniques described herein may provide several advantages. Because the devices not have to wait for request to timeout to determine its network location, the techniques described herein may provide better performance in previous techniques. Further, the techniques herein provide greater location determination accuracy, because request timeouts, which may happen occasionally during normal network operation, are not treated as indicating the location of the device.

FIG. 1 is a diagram of an example environment 100 depicting an example interaction between a device 130 and an internal DNS server 170 for determining the device location. As shown, the environment 100 includes an internal network 120 connecting a network management system 110, a device 130, and an internal DNS server 170. The internal network 120 is also connected to the Internet 150. In external DNS server 175 is connected to the Internet 150.

Figure 2:
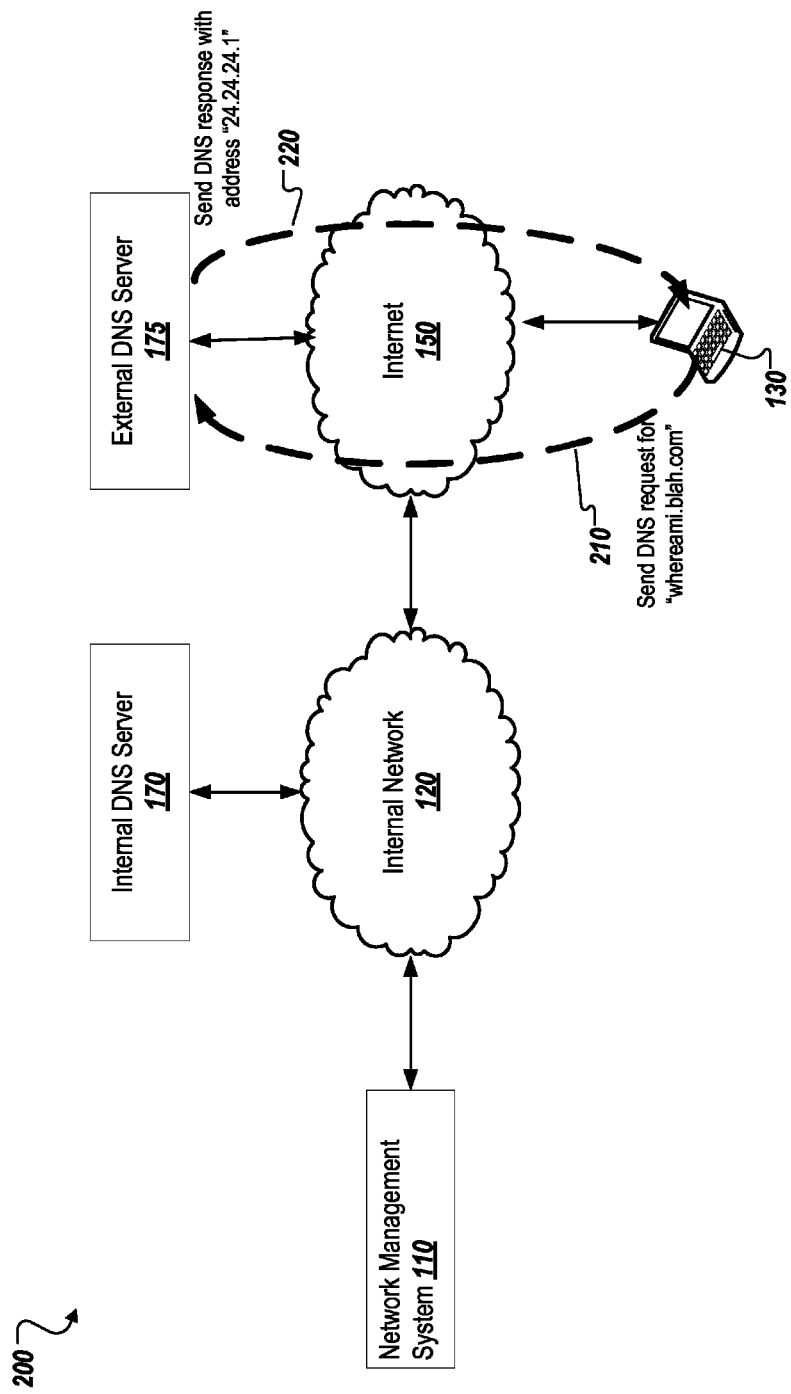
FIG. 2 is a diagram of an example environment depicting an example interaction between a device and an external DNS server.

In operation, the device 130 queries the internal DNS server 170 over the internal network 120. The device 130 sends a DNS request for a predetermined domain name. The internal DNS server 170 responds with an address local to the internal network 120. Device 130 determines that is connected to an internal network based on this returned address. If the device 130 is connected to an external network, such as the Internet 150, an external or public address will be returned in response to the DNS query. This scenario is shown in FIG. 2.

As shown, environment 100 includes the internal network 120. As shown, the environment 100 includes an internal network 120. In some implementations, the internal network 120 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 120 in such configurations, the device still may be required to authenticate in order to access resources on the internal network 120 and/or on the Internet 150. Such a configuration is often referred to as a Bring Your Own Device (BYOD) network in which users are free to use their own personal devices for connecting to the network. In some implementations, the entity that controls the internal network 120 may issue devices to users for use on the internal network 120. The internal network 120 may also be a wired network, such as an Ethernet network.

The environment 100 also includes the device 130 connected to internal network 120. In some implementations, the device 130 may be a mobile device, such as a cellular telephone, a smartphone, a tablet, a laptop or other similar computing device. The device 130 may also be a wired device such as a desktop computer. The device 130 may also be a server. In some implementations, the device 130 may be a personal device associated with one or more users. The device 130 may also be a device issued or owned by the entity that provides the internal network 120, such as a company-issued smartphone or laptop. In some implementations, the device 130 may include network access or web browsing software (e.g., a web browser) for accessing resources on the Internet 150.

The network management system 110 is also connected to the internal network 120. In operation, network management system 110 may be operable to provide a network configuration to devices connected to the internal network 120, such as the device 130. In some cases, network manager system 110 may provide the network configuration in the form of proxy automatic configuration (PAC) scripts. The PAC scripts may be executed by the network devices in order to control their behavior when accessing the network. In some implementations, the network management system 110 may provide device 130 with PAC script including instructions operable to implement the behaviors described herein. For example, the PAC script provided to the device 130 by network management system 110 may cause a device 130 to query a DNS server for a predetermined location determination domain name, such as the example shown in FIG. 1 of "whereami.blah.com." The PAC script may check the address returned it responses DNS query to determine whether it is a local address or a public address. Based on the determination, but may determine the location of the device 130. Based on the location, the PAC script may cause the device to perform different networking behaviors, such as, for example, using a proxy server when connected to the internal network 120, not using a proxy server when connected to the Internet 150, or other behaviors. Although several examples herein discuss using a proxy server on an internal network, other types of internal network configurations are contemplated, including, but not limited to, applying local signatures, using a local filtering application, or other configurations.

The internal DNS server 170 is also connected to the internal network 120. In some implementations, the internal data server 170 may be a customized DNS server operable to standard DNS server configured with an internal address for a location determination domain name or set of location determination domain names. For example, internal DNS server 170 may be a BIND server with a DNS record mapping the domain name "wheream.blah.com" to the address "10.100.100.1." In some implementations, the internal DNS server 170 may be operable to respond to DNS requests for location determination domain names, and to forward requests for other domain names to another DNS server, such as, for example, the external DNS server 175. The internal DNS server 170 may also include a DNS cache containing records received from another DNS server, such as authoritative DNS server.

In some implementations, the internal DNS server 170 may return the response to the location determination domain name a star on the source address from which the request is received. For example, if the internal DNS server 170 receives a DNS request for the domain name "whereami.blah.com" from a source address known to be on the internal network 120, the internal DNS server 170 may respond with a local address. Such a response indicates to the requesting device that is connected to the internal network 120. Conversely, if the internal DNS server 170 receives a request for the domain name "whereami.blah.com," from an external address known not to be on the internal network 120, the internal DNS server 170 may respond with an external address. Such a response may indicate to the requesting device that is connected to a network other than the internal network 120, such as the Internet 150.

FIG. 1 also shows an interaction between the device 130 in the internal DNS server 170 allowing the device to determine its location. At 180, the device 130 sends a DNS request to the internal DNS server 170 for the domain name "whereami.blah.com." At 190, the internal DNS server 170 responds with an address of "10.$100 hundred dollars one." The device 130 may determine that it is connected to the internal network 120 by examining this response.

FIG. 2 is a diagram of an example environment 200 depicting an example interaction between the device 130 and the external DNS server 175. In the environment 200, the device 130 is connected to the Internet 150 instead of the internal network 120. In operation, the DNS request sent by the device 130 at 210 is serviced by the external DNS server 175 instead of the internal DNS server 170 as in FIG. 1. The external DNS server 175 to the DNS response at 220 including a public address. The device 130 may determine it is connected to a network other than the internal network 120, such as the Internet 150, by examining the address in this response. In some implementations, the external DNS server 175 may be controlled by an entity different than the owner of the internal network 120.

Figure 3:
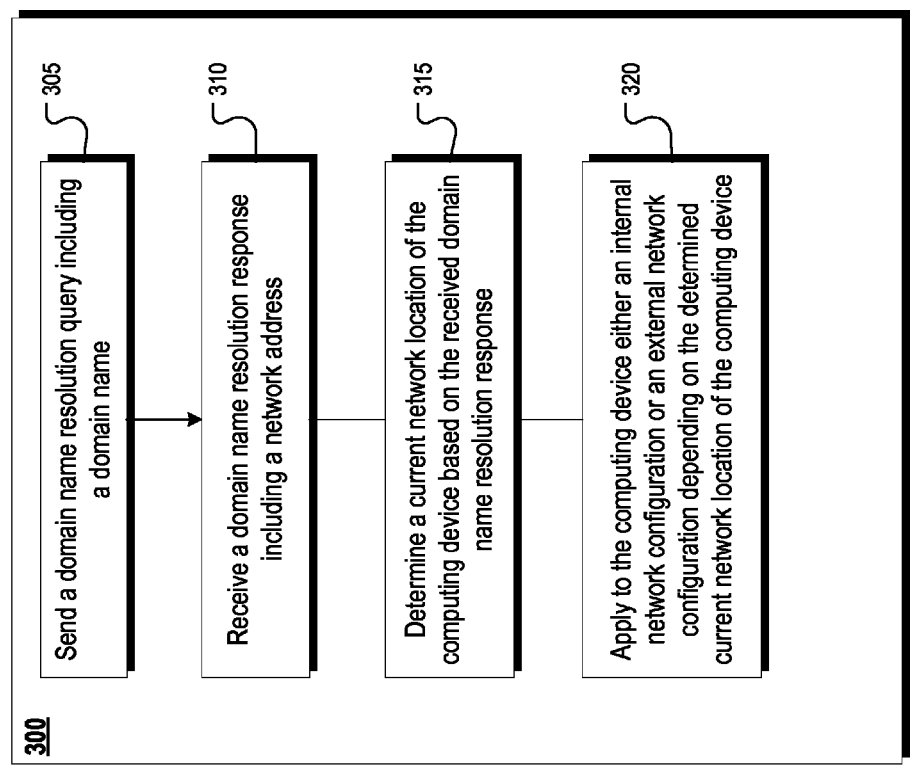
FIG. 3 is a flow chart of an example process of determining a device's location based on responses to domain name queries.

FIG. 3 is a flow chart of an example process of determining a device's location based on responses to domain name queries. At 305, a domain name resolution query including a domain name is sent. In some implementations, the domain name resolution query may be sent by device to a DNS server using the DNS protocol.

At 310, a domain name resolution response including a network address is received. In some implementations, the domain name resolution response may be formatted according to the DNS protocol. The network address may be an Internet Protocol (IP) address, and IPv6 address, or another type of address.

At 315, the current network location of the computing device is determined based on the receives domain name resolution response. In some implementations, the determination is made by analyzing the network address received in the domain name resolution response to determine if the network address is an internal network address. For example, the network address may be analyzed to determine if it is in a range of addresses reserved for private network use, such as IP addresses beginning with "192" or "10." In some cases, the determination is made by comparing the received network address to a preconfigured network address indicated to be internal. For example, a PAC script running on a device may have a particular IP address designated as indicating that the device is on an internal network.

At 320, either an internal network configuration or an external network configuration is applied to the computing device depending on the determined current network location of the computing device. In some implementations, applying either the internal network configuration or the external network configuration involves executing different logic branches of the PAC script running on the device. For example, the PAC script may include instructions to use a proxy server when connected to an internal network as part of the internal network configuration, and to not use a proxy server as part of the external network configuration when connected to an external network.

Figure 4:
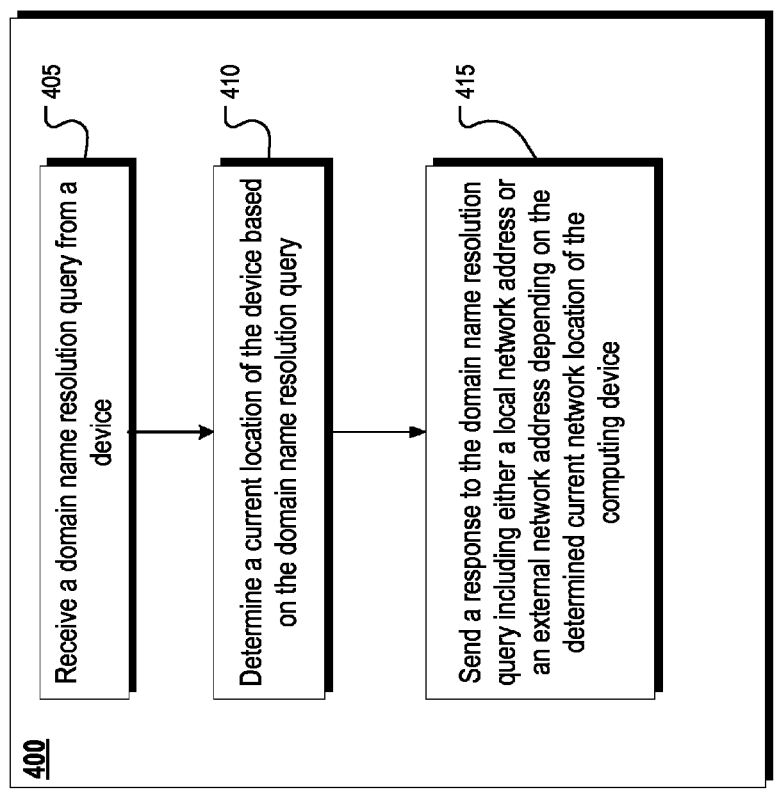
FIG. 4 is a flow chart of an example process of selectively returning different addresses to a domain name query based on the determined location of the requesting device.

FIG. 4 is a flow chart of an example process of selectively returning different addresses to a domain name query based on the determined location of the requesting device. At 405, the domain name resolution query is received from a device. At 410, a current location of the device is determined based on the domain name resolution query. In some implementations, the current location of the device is determined by examining a source address associated with the domain name resolution query. At 415, a response to the domain name resolution query is sent including either a local network address or an external network address depending on the determined current network location of the computing device.

Figure 5:
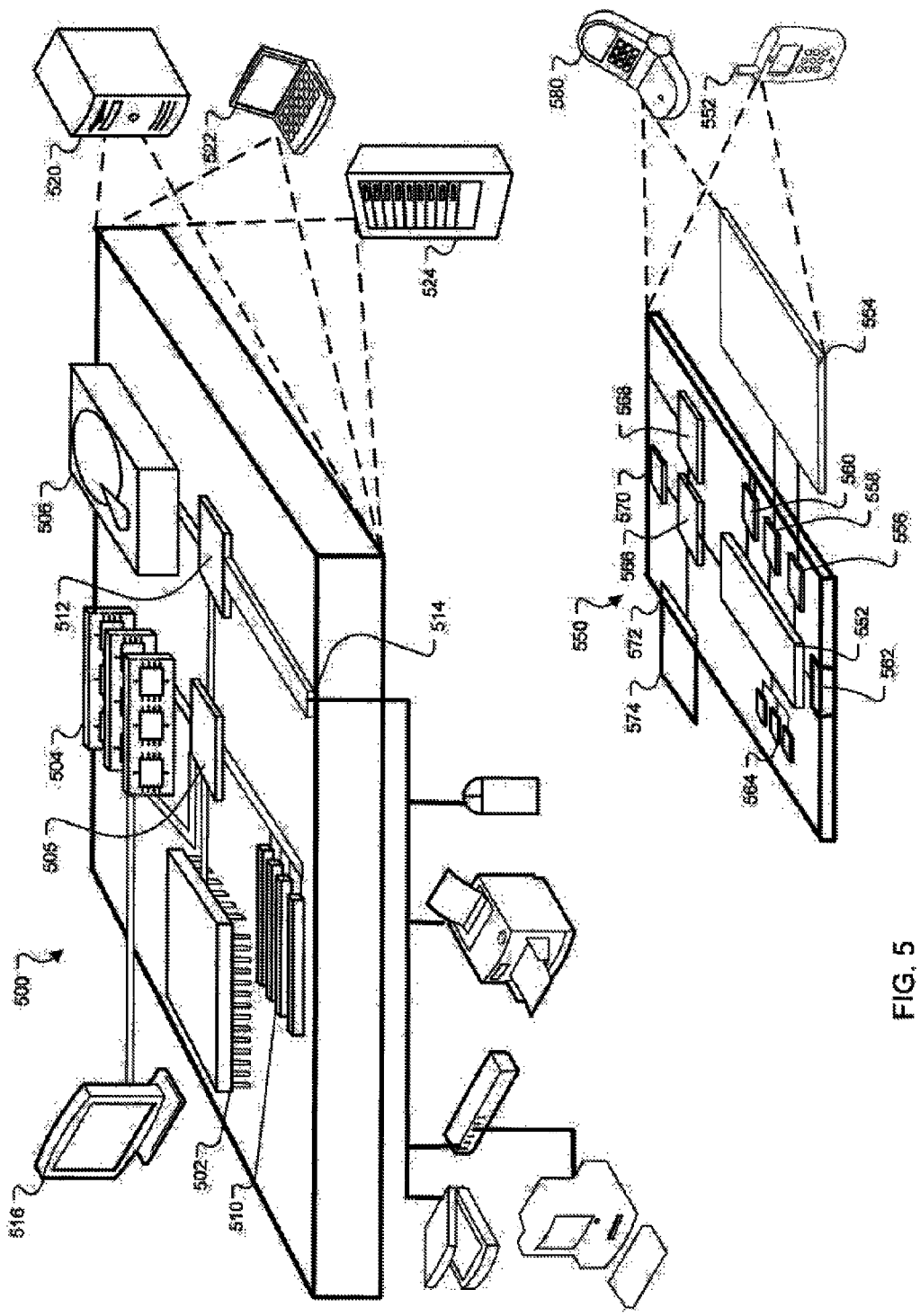
FIG. 5 is a diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors in a computing device, the method comprising:
   sending a domain name resolution query including a domain name;
   receiving a domain name resolution response including a network address;
   determining a current network location of the computing device based on the received domain name resolution response; and
   applying to the computing device either an internal network configuration or an external network configuration depending on the determined current network location of the computing device.

2. The method of claim 1, wherein sending the domain name resolution query includes sending a Domain Name System (DNS) request, and receiving the domain name resolution response includes receiving a DNS response.

3. The method of claim 1, wherein applying the internal network configuration includes updating a network configuration on the computing device to use a proxy server.

4. The method of claim 1, wherein applying the external network configuration includes updating a network configuration on the computing device to not use a proxy server.

5. The method of claim 1, wherein determining a current network location of the computing device based on the received domain name resolution response includes determining that the current network location is an internal location based on the network address being an internal network address.

6. The method of claim 1, wherein determining a current network location of the computing device based on the received domain name resolution response includes determining that the current network location is an external location based on the network address being an external network address.

7. The method of claim 1, wherein the domain name is a predetermined location-determination domain name configured to resolve to an internal network address when the computing device is on an internal network and to resolve to an external network address when the computing device is on an external network.

8. A computer-implemented method executed by one or more processors, the method comprising:
   receiving a domain name resolution query from a device;
   determining a current location of the device based on the domain name resolution query; and
   sending a response to the domain name resolution query including either a local network address or an external network address depending on the determined current network location of the computing device.

9. The method of claim 8, wherein receiving the domain name resolution query includes receiving a Domain Name System (DNS) request, and sending the response to the domain name resolution query includes sending a DNS response.

10. The method of claim 8, wherein determining a current location of the device based on the domain name resolution query includes examining a source address associated with the domain name resolution query.

11. A system comprising:
    memory for storing data; and
    one or more processors operable to perform operations comprising:
       sending a domain name resolution query including a domain name;
       receiving a domain name resolution response including a network address;
       determining a current network location of the computing device based on the received domain name resolution response; and
       applying to the computing device either an internal network configuration or an external network configuration depending on the determined current network location of the computing device.

12. The system of claim 11, wherein sending the domain name resolution query includes sending a Domain Name System (DNS) request, and receiving the domain name resolution response includes receiving a DNS response.

13. The system of claim 11, wherein applying the internal network configuration includes updating a network configuration on the computing device to use a proxy server.

14. The system of claim 11, wherein applying the external network configuration includes updating a network configuration on the computing device to not use a proxy server.

15. The system of claim 11, wherein determining a current network location of the computing device based on the received domain name resolution response includes determining that the current network location is an internal location based on the network address being an internal network address.

16. The system of claim 11, wherein determining a current network location of the computing device based on the received domain name resolution response includes determining that the current network location is an external location based on the network address being an external network address.

17. The system of claim 11, wherein the domain name is a predetermined location-determination domain name configured to resolve to an internal network address when the computing device is on an internal network and to resolve to an external network address when the computing device is on an external network.

18. A system comprising:
    memory for storing data; and
    one or more processors operable to perform operations comprising:
       receiving a domain name resolution query from a device;
       determining a current location of the device based on the domain name resolution query; and
       sending a response to the domain name resolution query including either a local network address or an external network address depending on the determined current network location of the computing device.

19. The system of claim 18, wherein receiving the domain name resolution query includes receiving a Domain Name System (DNS) request, and sending the response to the domain name resolution query includes sending a DNS response.

20. The system of claim 18, wherein determining a current location of the device based on the domain name resolution query includes examining a source address associated with the domain name resolution query.

* * * * *